United States Patent
Lee et al.

(10) Patent No.: US 10,291,528 B2
(45) Date of Patent: May 14, 2019

(54) METHOD AND APPARATUS FOR TRANSMITTING DATA USING PADDING IN A WIRELESS COMMUNICATION SYSTEM

(71) Applicant: Samsung Electronics Co., Ltd., Suwon-si, Gyeonggi-do (KR)

(72) Inventors: Do-Young Lee, Suwon-si (KR); Seong-Joon Kim, Busan (KR); Young-Taek Kim, Suwon-si (KR); Byeong-Yun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 14/590,405

(22) Filed: Jan. 6, 2015

(65) Prior Publication Data

US 2015/0195816 A1  Jul. 9, 2015

(30) Foreign Application Priority Data

Jan. 6, 2014 (KR) .................. 10-2014-0001254

(51) Int. Cl.
*H04J 3/00* (2006.01)
*H04L 12/801* (2013.01)
*H04W 28/06* (2009.01)

(52) U.S. Cl.
CPC ............. *H04L 47/12* (2013.01); *H04W 28/06* (2013.01)

(58) Field of Classification Search
None
See application file for complete search history.

(56) References Cited

U.S. PATENT DOCUMENTS

| | | | | |
|---|---|---|---|---|
| 8,509,069 B1* | 8/2013 | Poon | ..................... | H04L 49/254 370/230 |
| 8,705,431 B2* | 4/2014 | Torsner | ................. | H04L 1/1664 370/315 |
| 2002/0181494 A1* | 12/2002 | Rhee | ....................... | H04L 29/06 370/465 |
| 2002/0196751 A1* | 12/2002 | Parizhsky | ............... | H04L 29/06 370/329 |
| 2004/0057423 A1* | 3/2004 | Beckmann | ........... | H04L 1/1614 370/352 |
| 2005/0226239 A1* | 10/2005 | Nishida | ................. | H04L 1/1874 370/389 |
| 2006/0193391 A1* | 8/2006 | Borran | .................. | H04L 1/0026 375/260 |
| 2006/0195629 A1* | 8/2006 | Sharma | ................. | H04L 1/1685 710/30 |
| 2006/0251105 A1* | 11/2006 | Kim | ....................... | H04L 1/1685 370/449 |

(Continued)

OTHER PUBLICATIONS

10415866,Specification,May 5, 2003; U.S. Appl. No. 10/415,866 by Beckmann et al., "Method for Exchanging Data Packets Between Two Service Providers of a Radio Transmiision System".*

*Primary Examiner* — Kwang B Yao
*Assistant Examiner* — Juvena W Loo
(74) *Attorney, Agent, or Firm* — Jefferson IP Law, LLP (57) ABSTRACT

An apparatus for transmitting data in a wireless communication system is provided. The apparatus includes a controller including a processor configured to generate and store data in a padding space, when padding exists in a data space, and a transmitter configured to transmit the data stored in the padding space.

18 Claims, 7 Drawing Sheets

(56) References Cited

U.S. PATENT DOCUMENTS

| | | | | |
|---|---|---|---|---|
| 2008/0107079 A1* | 5/2008 | Bae | H04W 76/02 | 370/331 |
| 2008/0137689 A1* | 6/2008 | Shiizaki | H04L 1/1887 | 370/498 |
| 2009/0137252 A1* | 5/2009 | Masseroni | H04L 47/10 | 455/446 |
| 2009/0168920 A1* | 7/2009 | Chen | H04L 1/1835 | 375/295 |
| 2009/0313516 A1* | 12/2009 | Shin | H04L 1/0003 | 714/748 |
| 2009/0316637 A1* | 12/2009 | Yi | H04W 72/10 | 370/329 |
| 2010/0302960 A1* | 12/2010 | Bjorken | H04L 1/0003 | 370/252 |
| 2011/0002347 A1* | 1/2011 | Agiwal | H04W 28/065 | 370/474 |
| 2011/0103311 A1* | 5/2011 | Navratil | H04L 1/1685 | 370/328 |
| 2012/0099526 A1* | 4/2012 | Murase | H04L 1/0045 | 370/328 |
| 2013/0051334 A1* | 2/2013 | Sammour | H04L 47/10 | 370/329 |

* cited by examiner

RELATED ART

FIG.1

RELATED ART

METHOD AND APPARATUS FOR TRANSMITTING DATA USING PADDING IN A WIRELESS COMMUNICATION SYSTEM

CROSS-REFERENCE TO RELATED APPLICATION(S)

This application claims the benefit under 35 U.S.C. § 119(a) of a Korean patent application filed on Jan. 6, 2014 in the Korean Intellectual Property Office and assigned Serial number 10-2014-0001254, the entire disclosure of which is hereby incorporated by reference.

TECHNICAL FIELD

The present disclosure relates to a method and apparatus for transmitting data using padding in a wireless communication system.

BACKGROUND

Wireless communication systems have evolved into high-speed and high-quality wireless data packet communication systems for data and multimedia services, which is far beyond the voice-oriented services for which the wireless communications systems were initially developed. For example, Universal Mobile Telecommunications System (UMTS) systems, which are 3-Generation (3G) wireless communication systems based on Global System for Mobile Communication (GSM) and using Code Division Multiple Access (CDMA), provide a seamless service capable of transmitting packet-based text, digitalized voice or video, and multimedia data at a high speed of 2 Mega-bits per second (Mbps) or more to radiophone or computer users wherever they are located. These UMTS systems employ a concept of packet-switched access using a packet protocol such as an Internet Protocol (IP), and are always accessible to any other terminal within a network.

In a 3rd Generation Partnership Project (3GPP), which is for standardizing UMTS systems, Long Term Evolution (LTE) systems are being considered as next-generation wireless communication systems of the UMTS systems. These LTE systems are technologies for implementing high-speed packet-based communication of 100 Mbps or more. This can be accomplished several different ways. As an example, a way of simplifying a network structure and reducing the number of nodes located on a communication path, it may be possible to make wireless protocols closer to a maximum number of wireless channels.

Figure 1:
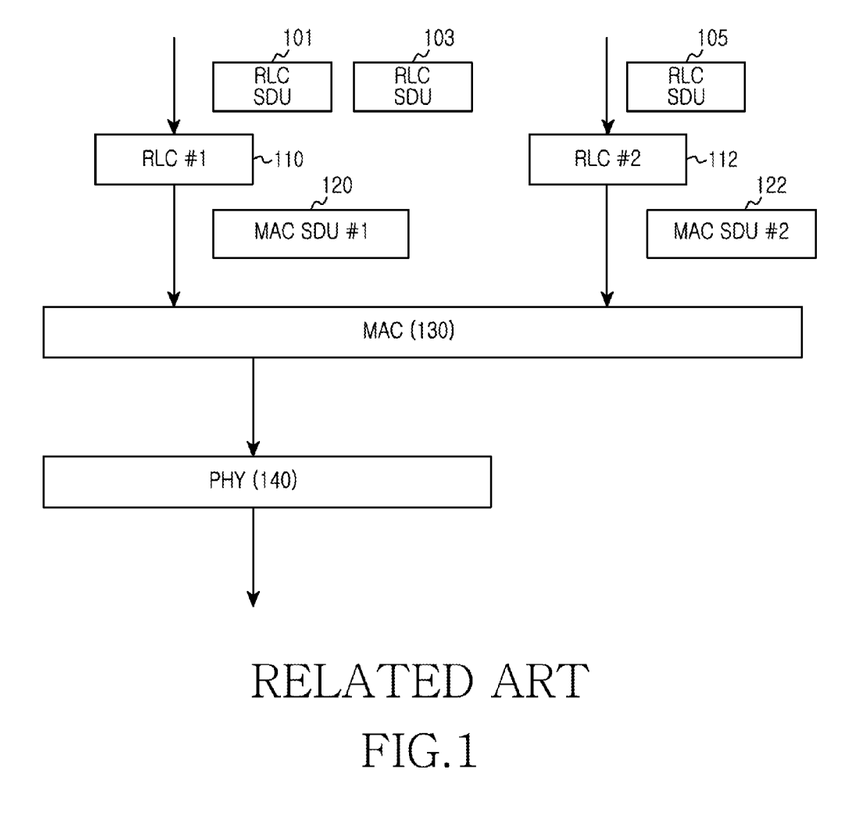
FIG. 1 illustrates a role of a Media Access Control (MAC) layer for a wireless communication system according to the related art.

FIG. 1 illustrates a role of a Media Access Control (MAC) layer for a wireless communication system according to the related art.

Specifically, FIG. 1 illustrates that Radio Link Control (RLC) Service Data Units (SDU) 101 and 103 are constructed and transmitted as one MAC SDU #1 120 to a MAC layer 130 through RLC #1 110, and an RLC SDU 105 is constructed and transmitted as one MAC SDU #2 122 to the MAC layer 130 through RLC #2 112.

Referring to FIG. 1, in the RLC #1 110 and RLC #2 112, the RLC SDUs 101, 103, and 105 received from an upper layer are constructed and transmitted as one RLC Protocol Data Unit (PDU) to the MAC layer 130. In view of the MAC layer 130, the RLC PDU can be interpreted as the MAC SDU #1 120 and MAC SDU #2 122. The MAC layer 130 combines and constructs the MAC SDU #1 120 and MAC SDU #2 122 as one MAC PDU and transmits the MAC PDU to a Physical (PHY) layer 140. The MAC PDU can include MAC SDUs 120 and 122 for data transmission in the RLC #1 110 and RLC #2 112, and MAC SDUs 120 and 122 for control that is exchangeable in the MAC layer 130 between a transmitter and a receiver. Also, the MAC SDUs 120 and 122 for control can be transmitted, together with the other MAC SDUs for data transmission, within one MAC PDU, or can be singularly included and transmitted within the MAC PDU. Accordingly, a MAC PDU header should be constructed to distinguish the MAC SDUs for data transmission and the MAC SDUs for control.

Figure 2:
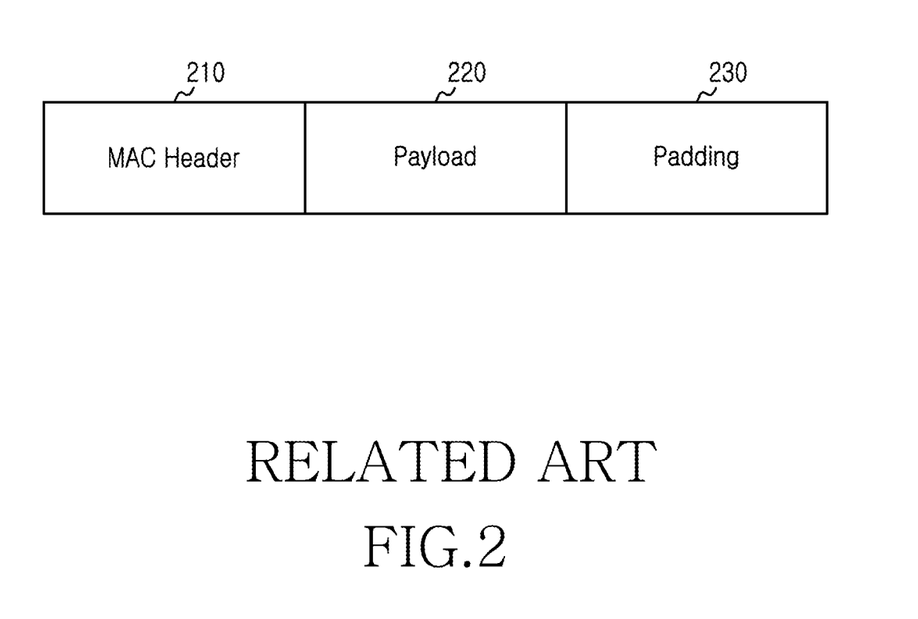
FIG. 2 illustrates a construction of a MAC Protocol Data Unit (PDU) in a wireless communication system according to the related art.

FIG. 2 illustrates a construction of a MAC PDU in a wireless communication system according to the related art.

Referring to FIG. 2, the MAC PDU includes a MAC header 210, and a payload 220 including one or more MAC SDUs. The MAC header 210 includes a 'length' field indicating a length of a payload indicated by header information, and a Logical Channel ID (LCID) for distinguishing the MAC SDUs transmitted from several logical channels. If the MAC PDU has an extra space despite including all of control MAC SDUs and data MAC SDUs delivered from RLC, the remnant portion is filled with meaningless bits. This portion is called MAC padding 230.

The MAC padding 230 is generated because, at allocation, it is actually impossible to allocate only as many resources as a necessarily required size. Particularly, in a case of an UpLink (UL), a base station allocates the UL to a terminal in accordance to a UL channel situation and a buffer state reported by the terminal. At this time, the total amount of the UL allocation is divided on a per-Time Transmission Interval (TTI) basis in accordance to the reported buffer state. The base station cannot accurately predict the buffer state because the buffer state itself is not precise and information of a time when transmitting the buffer state and the buffer state of an actual allocation time point. Also, because the UL allocation follows a Modulation and Coding Scheme (MCS) and a combination of Resource Blocks (RB), it is impossible to perform allocation of a precise size. Accordingly, the base station continuously performs allocation till a time point of generation of allocation in which the entire resources are all padding. The thus generated MAC padding is meaningless information, so there is a need for a way to more efficiently use this MAC padding.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for generating data in a wireless communication system.

Another aspect of the present disclosure is to provide an apparatus and method for replacing padding, which is meaningless information, with data in a wireless communication system.

Another aspect of the present disclosure is to provide an apparatus and method for increasing transmission efficiency in a wireless communication system.

In accordance with an aspect of the present disclosure, an apparatus for transmitting data in a wireless communication system is provided. The apparatus includes a controller including a processor configured to generate and store data in a padding space, when padding exists in the padding space, and a transmitter configured to transmit the data stored in the padding space.

In accordance with another aspect of the present disclosure, a method for transmitting a data unit by an apparatus of a wireless communication system is provided. The method includes generating and storing, by a processor of the apparatus, data in a padding space, when padding exists in a data space, and transmitting the data stored in the padding space.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Below, the present disclosure describes a technology for replacing padding with data in a wireless communication system.

In the following description, the terms expressing information for identifying used objects are for description convenience. Accordingly, the present disclosure is not limited to the terms described later, and can use other terms indicating objects having the same technological meaning. For example, in the following description, 'terminal' is used to indicate a communication device of a user side, but 'terminal' can be denoted as 'MS', 'MT', 'UE' and the like For description convenience below, the present disclosure uses the terms and names defined in the 3rd Generation Partnership Project (3GPP) Long Term Evolution (LTE) standard. However, the present disclosure is not limited to the aforementioned terms and names, and can be identically applied even to systems following other standards.

A process of transmitting a data unit in a wireless communication system according to an embodiment of the present disclosure is described below. A terminal transmits a request for uplink resources to a base station, and the base station allocates the resources to the terminal in response to the terminal's request, and the terminal, for which the resources are allocated, generates the data unit in consideration of an allocated bandwidth. Here, being allocated the resources is the same meaning as being allocated a grant. If padding is generated in this process, the terminal performs a control process for replacing the padding with data. Here, the control process is performed irrespective of the existence or absence of a retransmission request.

The terminal performs a control process for replacing the generated padding with data. In detail, the terminal allocates as many resources as the size of the padding to an upper layer data unit. In accordance to a mode, the terminal performs a process of, when it is a response mode, generating a data unit replacing the padding with one of a data unit failing to receive an acknowledgement response and a part of the data unit and, when it is a non-response mode, generating a data unit replacing the padding with one of the last transmitted data unit and data units transmitted within a re-response time from the last transmitted data unit and then, arranging the sequence of the newly generated data units and constructing a header in accordance to the sequence of the newly generated data units.

If two resources are allocated to the terminal, the terminal can reconstruct padding existing in each resource as meaningful data in the same method as when the terminal is allocated one resource. In addition, to simplify processing, the terminal may compare a size of actual information of a firstly allocated resource and a size of a secondly allocated resource in which only padding exists. If the size of the secondly allocated resource in which only the padding exists is greater than or is equal to the size of the actual information of the firstly allocated resource, then the terminal may repeatedly transmit data of the firstly allocated resource to the secondly allocated resource as it is.

If the terminal is allocated a plurality of resources, the terminal can reconstruct padding existing in each resource as meaningful data in the same method as when the terminal is allocated one resource. In addition, to simplify processing, the terminal can compare a size of actual information of resources allocated sequentially starting from the first resource and a size of allocated resources in which only padding exists. If the size of the allocated resources in which only the padding exists is greater than or is equal to the size of the actual information of the resources allocated sequentially starting from the first resource, then the terminal can repeatedly transmit data of the resources allocated sequentially starting from the first resource, to the allocated resources in which only the padding exists. Also, the terminal may combine and use two methods.

FIGS. 3 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 3:
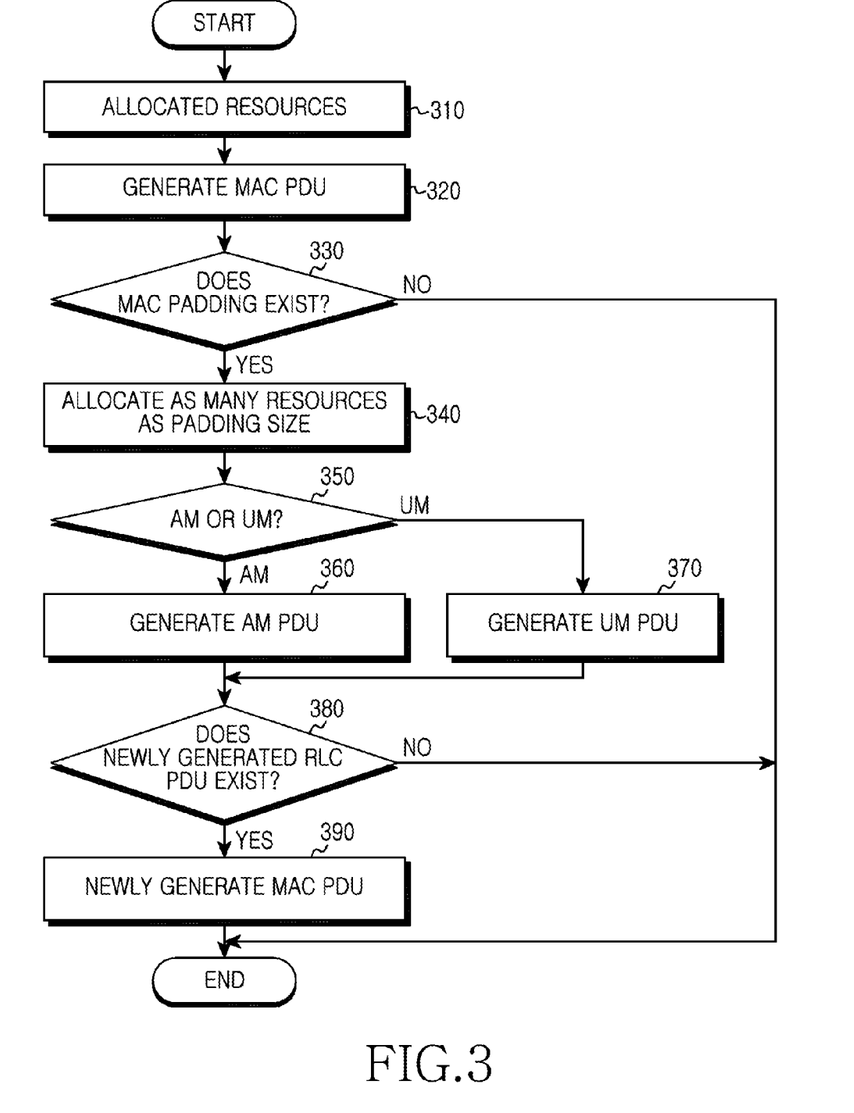
FIG. 3 illustrates a MAC PDU generation process in a wireless communication system according to an embodiment of the present disclosure.

FIG. 3 illustrates a Media Access Control (MAC) Protocol Data Unit (PDU) generation process in a wireless communication system according to an embodiment of the present disclosure.

Referring to FIG. 3, in operation 310, resources are allocated to a terminal. In detail, the terminal transmits a request for uplink resources to a base station, and the base station allocates the resources to the terminal in response to the terminal's request. The terminal, to which the resources are allocated by the base station, generates a MAC PDU in consideration of an allocated bandwidth.

Next, in operation 320, the terminal generates the MAC PDU. If it is an Unacknowledged Mode (UM), the terminal records a MAC PDU generation time. An Acknowledged Mode (AM) signifies a mode supporting a function of retransmission for a received error, and the UM signifies a mode not supporting the function of retransmission for the received error. In the UM, the terminal does not perform retransmission unlike the AM. Accordingly, if the MAC PDU is generated, then the terminal records the MAC PDU generation time, and a receiving side waits for a retransmission through Hybrid Automatic Repeat Request (HARQ) retransmission during a time duration of a predefined length (hereinafter, referred to as "re-ordering time") based on the MAC PDU generation time. A transmitting side can define, as a retransmission object, a Radio Link Control (RLC) PDU having a possibility in which the receiving side will wait during a re-ordering time, and retransmit this through a MAC padding portion, thereby being able to get a gain of a repeated transmission. At this time, the RLC PDU capable of becoming the retransmission object can be limited to the last transmitted RLC PDU and an RLC PDU transmitted within the re-ordering time from a time point of transmission of the last transmitted RLC PDU.

Next, in operation 330, the terminal determines if MAC padding is needed and/or whether the MAC padding exists. The terminal requests, to a base station, an allocation of a resource. If the base station allocates resources to the terminal in response to the request, because there is not synchronization between the request and the allocation, the terminal can generate meaningless padding. If the terminal confirms that the MAC PDU and the MAC padding does not exist in a place except for a MAC header and a payload, then the terminal delivers the MAC PDU to a Physical (PHY) layer as it is, because there is a need for additional work.

If it is determined in operation 330 that the MAC padding is needed and/or that the MAC padding exists, then operation 340 is performed. For example, if the MAC padding is generated, then in operation 340 the terminal allocates as many resources as the size of the padding by RLC. The terminal allocates as many resources as the size of the padding by each RLC. That is, to replace the padding being meaningless information with RLC data, the terminal can provide as many resources as the size of the padding of the terminal by each RLC and generate a retransmission PDU. Here, the RLC data can be one of RLC PDUs not failing to receive an Acknowledgement (ACK) response, a resegmentation RLC PDU, or a combination thereof.

In operation 350, the terminal determines whether it is the AM or the UM. In detail, the terminal can determine whether it is the AM or the UM and generate a PDU in each different method. RLC can operate in the AM being a mode performing a retransmission operation and the UM being a mode not performing the retransmission. The base stations sets/determines whether it is the AM or the UM. In a case of the AM, if it is determined that there is an RLC PDU not received in counterpart RLC, then the terminal sends a notification through a state PDU. This is called a Non-Acknowledgement (NACK) response. A reception side having received the state PDU retransmits a corresponding RLC PDU. Also, the receiving side having received the state PDU in accordance to a specific condition transmits the received RLC PDU to a transmitting side for the purpose of confirmation. This is called an ACK response.

If it is the AM in operation 350, then in operation 360 the terminal generates a PDU corresponding to the AM. In detail, if it is the AM, then the terminal generates retransmission PDUs by a PDU failing to receive the ACK response or a part of the PDU in accordance to an allocated size. As an embodiment of a process of selecting the PDU, various methods can be used, such as a method of comparing and selecting ACK/NACK information of a HARQ or a channel environment of an initial transmission time or an RLC retransmission recursion and the like, a method of selecting based on minimizing the size of an RLC header at the time of retransmission PDU, and the like.

If it is the UM in operation 350, then in operation 370 the terminal generates a PDU corresponding to the UM. In detail, if it is the UM, then the terminal generates repeated transmission PDUs by selecting among a just-before last transmitted PDU and PDUs transmitted within a re-ordering time from the last transmitted PDU. As an embodiment of a process of selecting the PDU, various methods can be used, such as a method of selecting based on ACK/NACK information of a HARQ or a channel environment of an initial transmission time or an RLC repeated transmission recursion, a method including considering a combination of PDUs capable of making most use of allocated resources, and the like.

In operation 380, the terminal determines if newly generated RLC data exists. The newly generated RLC data can be an RLC PDU, a resegmentation RLC PDU, or a combination thereof. If the newly generated RLC data exists, then the terminal proceeds to operation 390 of constructing a MAC header in rearranged sequence. If the newly generated RLC data does not exist, because there is no change in the MAC header, the terminal does not perform a process of updating the MAC header.

In operation 390, the terminal constructs the MAC header in the rearranged sequence. In detail, the terminal records, in the MAC header, the rearranged sequence of the newly constructed RLC data, including the newly generated RLC data. If the newly generated RLC data to replace the MAC padding exists, then the terminal rearranges and constructs the sequence of the newly generated RLC data for the sake of recording the newly generated RLC data in the MAC header.

The sequence of resource allocation mentioned later represents a sequence used when generating the MAC PDU. Accordingly, it can be more effective to use various embodiments described in FIG. 4 and FIG. 5 in sequence in which the size of allocated resources is large.

Figure 4:
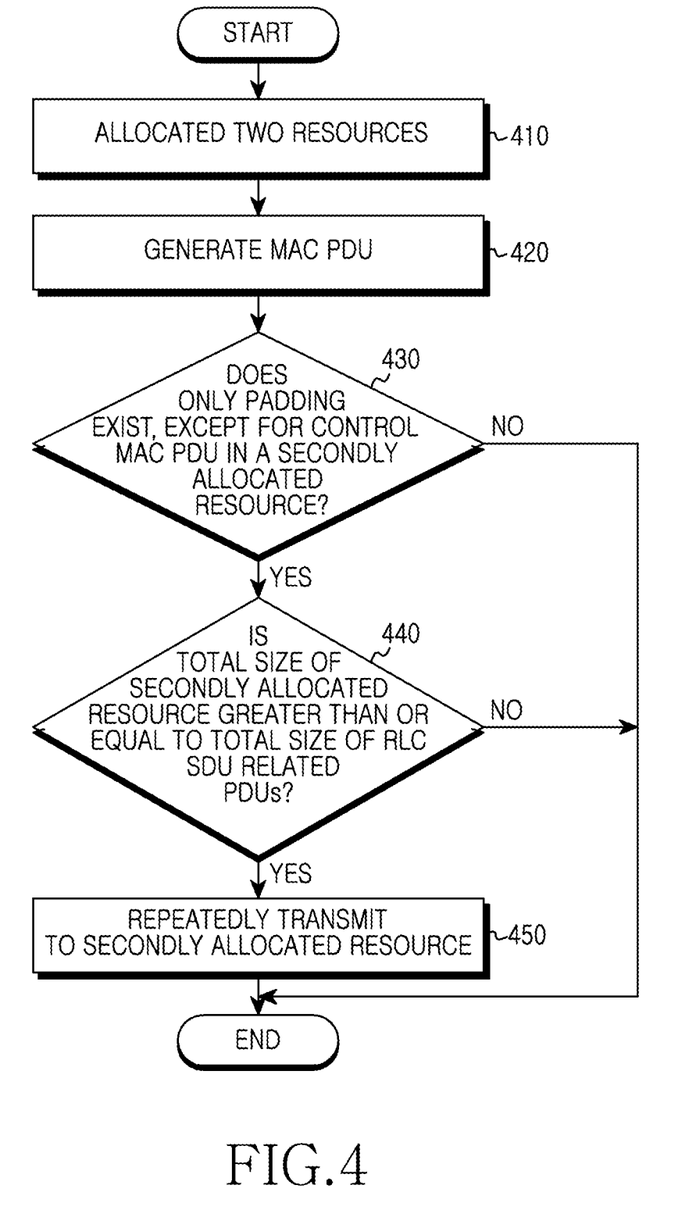
FIG. 4 illustrates a MAC PDU generation process when two resources are allocated to a terminal at a same Time Transmission Interval (TTI) in a wireless communication system according to an embodiment of the present disclosure.

FIG. 4 illustrates a MAC PDU generation process when two resources are allocated to a terminal at a same Time Transmission Interval (TTI) in a wireless communication system according to an embodiment of the present disclosure.

Referring to the generation process of FIG. 4, this generation process may include allocating as many resources as a MAC padding length by each RLC capable of generating a retransmission PDU, generating the retransmission PDU in accordance to when it is an AM and when it is a UM, and newly generating a MAC PDU. This can be applied to each resource. This embodiment has an advantage that it can be more simply processed than the embodiment of FIG. 3.

Referring to FIG. 4, in operation 410, the terminal is allocated two resources. In detail, the terminal transmits a request for uplink resources to a base station, and the base station allocates the resources to the terminal in response to the terminal's request. The terminal, to which the resources are allocated by the base station, generates a MAC PDU in consideration of an allocated bandwidth.

In operation 420, the terminal generates the MAC PDU. If it is the UM, the terminal records a generation time. In detail, the terminal generates the MAC PDU sequentially starting from a firstly allocated resource. If the MAC PDU is generated, in RLC, when it is the UM, because the terminal waits for a retransmission through a HARQ retransmission during a re-ordering time without performing retransmission unlike when it is the AM, then the terminal selects among a last transmitted PDU and PDUs transmitted within a re-ordering time from the last transmitted PDU and records a MAC PDU generation time so as to transmit a repeated transmission PDU.

In operation 430, the terminal determines if only padding exists, except for a control MAC PDU, in a secondly allocated resource. In detail, if only the padding exists, except for the control MAC PDU, then the terminal proceeds to operation 440 which compares the total size of PDUs related to RLC data among the generated MAC PDUs and the size of the secondly allocated resource. If in operation 430 only the padding does not exist, except for the control MAC PDU, in the secondly allocated resource, then the terminal transmits the MAC PDU to a PHY layer without performing an additional process.

In operation 440, the terminal compares a total size of the MAC PDUs and a size of the secondly allocated resources. In detail, the terminal compares and determines the total size of PDUs related to RLC data among the generated MAC PDUs and the size of the secondly allocated resource. That is, the terminal checks if the remnant size except for the control MAC PDU among the secondly allocated resource is greater than or is equal to the PDUs related to the RLC data among the generated MAC PDUs. This process is a process for checking if an extra space capable of transmitting the PDUs related to the RLC data exists. If the remnant size except for the control MAC PDU in the secondly allocated resource is greater than or is equal to the total size of the PDUs related to the RLC data, then the terminal next goes to operation 450 which reproduces and transmits the PDU related to the RLC data to the secondly allocated resource.

In operation 450, the terminal repeatedly transmits the PDU related to the RLC data to the secondly allocated resource. In detail, if the remnant size, except for the control MAC PDU, in the secondly allocated resource is greater than or is equal to the total size of the PDUs related to the RLC data among the MAC PDUs of the firstly allocated resource, then the terminal repeatedly transmits the PDUs related to the RLC data among the MAC PDUs of the firstly allocated resource, to the secondly allocated resource. Repeatedly transmitting the PDUs related to the RLC data of the firstly allocated resource to the secondly allocated resource is because it can prepare for a transmission failure and, in accordance to this, increase a PDU transmission success rate more than transmitting padding of the secondly allocated resource as it is. If the MAC padding is generated in this process, additionally, the terminal can follow a process of allocating as many resources as a MAC padding length by each RLC capable of generating a retransmission PDU in accordance to a MAC PDU generation process, generating the retransmission PDU in accordance to when it is the AM and when it is the UM, and newly generating a MAC PDU in a wireless communication system according to an embodiment of the present disclosure.

Figure 5:
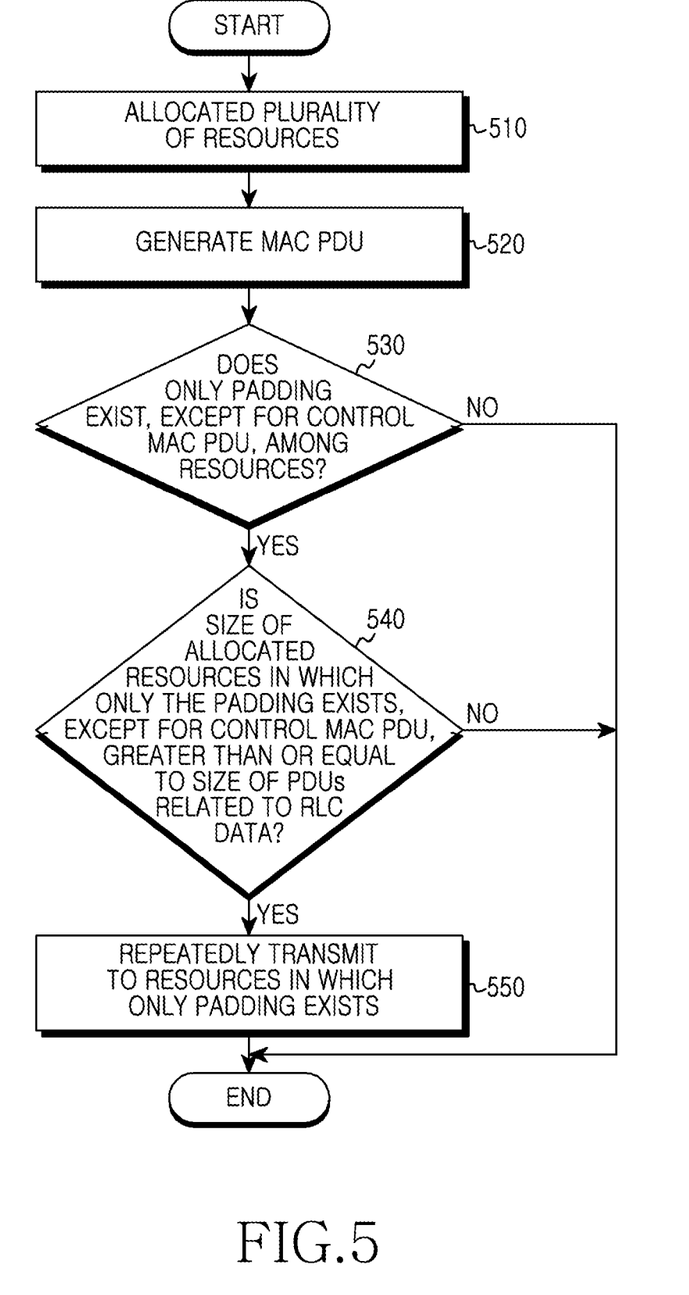
FIG. 5 illustrates a MAC PDU generation process when three or more resources are allocated to a terminal at a same TTI in a wireless communication system according to an embodiment of the present disclosure.

FIG. 5 illustrates a MAC PDU generation process when three or more resources are allocated to a terminal at a same TTI in a wireless communication system according to an embodiment of the present disclosure.

Referring to FIG. 5, in operation 510, three or more resources are allocated to a terminal. In detail, the terminal transmits a request for uplink resources to a base station, and the base station allocates the resources to the terminal in response to the terminal's request. The terminal, to which the resources are allocated from the base station, generates a MAC PDU in consideration of an allocated bandwidth.

In operation 520, the terminal generates the MAC PDU. If it is the UM, the terminal records a generation time. In detail, the terminal generates the MAC PDU sequentially starting from a firstly allocated resource. If the MAC PDU is generated, in RLC, when it is the UM, because the terminal waits for a retransmission through a HARQ retransmission during a re-ordering time without performing a retransmission unlike when it is the AM, then the terminal selects among a last transmitted PDU and PDUs transmitted within a re-ordering time from the last transmitted PDU and records a MAC PDU generation time so as to transmit a repeated transmission PDU.

In operation 530, the terminal determines if there are resources having only padding, except for a control MAC PDU, among resources. Undoubtedly, in this operation, if only the padding, except for the control MAC PDU, exists in all resources, the terminal follows a process of allocating as many resources as a MAC padding length by each RLC capable of generating a retransmission PDU, generating the retransmission PDU in accordance to when it is the AM and when it is the UM, and newly generating a MAC PDU. In addition, if there are resources in which only the padding exists except for the control MAC PDU, then the terminal proceeds to operation 540 of comparing a total size of PDUs related to RLC data among MAC PDUs generated sequentially starting from a firstly allocated resource and a size of resources in which only padding exists among the allocated resources. If there are not the resources in which only the padding exists except for the control MAC PDU, then the terminal transmits the MAC PDU to a PHY layer without performing an additional process.

In operation 540, the terminal compares the total size of the MAC PDUs and the size of the allocated resources. In detail, the terminal checks if the size of allocated resources in which only the padding exists, except for the control MAC PDU, is greater than or is equal to PDUs related to RLC data among MAC PDUs generated sequentially starting from the firstly allocated resource. If the PDU related to the RLC data is included in the non-first resources, then the terminal may identically apply an operation of comparing the corresponding resources in place of the first resources and the allocated resources in which the only padding exists except for the control MAC PDU. This process is a process for checking if an extra space capable of transmitting PDUs related to RLC data exists. If the size of resources in which only the padding exists, except for the control MAC PDU, among the allocated resources is not greater than or equal to the total size of the PDUs related to the RLC data, a space capable of repeatedly transmitting the generated PDU to the allocated resources in which only the padding exists except for the control MAC PDU is deficient and therefore, in this case, the terminal follows a MAC PDU repeated generation process in the wireless communication system according to the embodiment of the present disclosure. If the size of the allocated resources in which only the padding exists is greater than or is equal to the total size of the PDUs related to the RLC data, then the terminal goes to operation 550 which reproduces and transmits the PDU related to the RLC data to the allocated resources in which only the padding exists. If the size of the allocated resources in which only the padding exists is not greater than or equal to the total size of the PDUs related to the RLC data, then the generation process ends.

In operation 550, the terminal repeatedly transmits the PDU related to the RLC data to the allocated resources in which only padding exists except for the control MAC PDU. In detail, if the size of the allocated resources in which only the padding exists, except for the control MAC PDU, is greater than or is equal to the total size of the PDUs related to the RLC data among the MAC PDUs, then the terminal repeatedly transmits the PDUs related to the RLC data among the MAC PDUs through the allocated resources in which only the padding exists except for the control MAC PDU. Repeatedly transmitting the PDUs related to the RLC data to the allocated resources in which only the padding exists is because it can prepare for a transmission failure and, in accordance to this, increase a PDU transmission success rate more than transmitting padding of the allocated resources in which only the padding exists except for the control MAC PDU as it is. If the MAC padding is generated in this process, additionally, the terminal may follow a process of allocating as many resources as a MAC padding length by each RLC capable of generating a retransmission PDU in accordance to a MAC PDU generation process, generating the retransmission PDU in accordance to when it is the AM and when it is the UM, and newly generating a MAC PDU in a wireless communication system according to an embodiment of the present disclosure.

An embodiment of the present disclosure according to the process of FIG. 5 when three resources are allocated to the terminal is described below. First, when the three resources are allocated to the terminal, if the total size of PDUs related to RLC data of a firstly allocated resource is less than or is equal to the size of second and thirdly allocated resources, then the terminal can follow a process of repeatedly transmitting the PDUs related to the RLC data of the firstly allocated resource to the secondly and thirdly allocated resources as it is, or repeatedly transmitting the PDUs related to the RLC data of the firstly allocated resource to the one of the secondly and thirdly allocated resources and allocating as many resources as a MAC padding length to the other one of the secondly and thirdly allocated resources by each RLC capable of generating a retransmission PDU, generating the retransmission PDU in accordance to when it is the AM and when it is the UM, and newly generating a MAC PDU. As another example, if the total size of PDUs related to RLC data of each of firstly and secondly allocated resources is less than or is equal to the size of a thirdly allocated resource, then the terminal can select one of the firstly and secondly allocated resources and repeatedly transmit the selected resource to the thirdly allocated resource. The aforementioned embodiment is identically applied even to when the number of allocated resources exceeds three.

Figure 6:
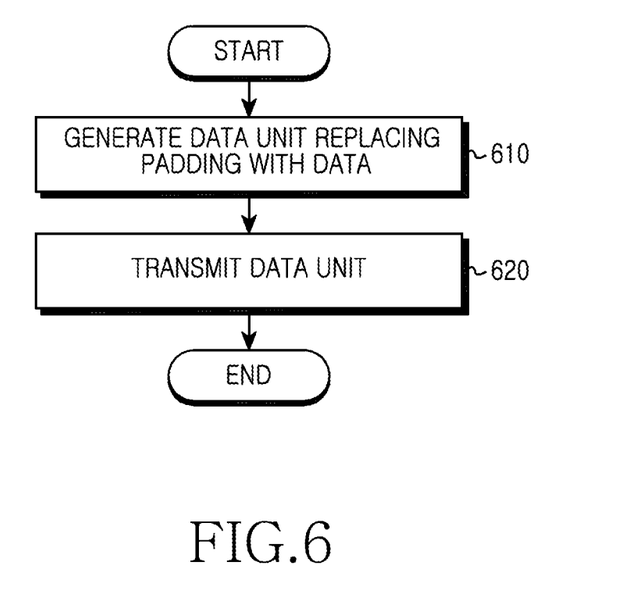
FIG. 6 illustrates an operation procedure of a terminal in a wireless communication system according to an embodiment of the present disclosure.

FIG. 6 illustrates an operation procedure of a terminal in a wireless communication system according to an embodiment of the present disclosure.

Referring to FIG. 6, in operation 610, a terminal generates a data unit replacing padding with data. In detail, irrespective of the existence or absence of a retransmission request, the terminal replaces the padding with the data and generates a data unit. The terminal performs a process of, when it is a response mode, generating a data unit replacing the padding with one of a data unit failing to receive an acknowledgement response and a part of the data unit and, when it is a non-response mode, generating a data unit replacing the padding with one of the last transmitted data unit and data units transmitted within a re-response time from the last transmitted data unit.

In operation 620, the terminal transmits the data unit. In a process of transmitting the data unit, the terminal transmits/receives a signal through a wireless channel such as signal band conversion, amplification and the like. That is, the terminal up converts the provided data unit into a Radio Frequency (RF) band signal and then transmits the RF band signal through an antenna, and down converts an RF band signal received through the antenna into a baseband signal.

Figure 7:
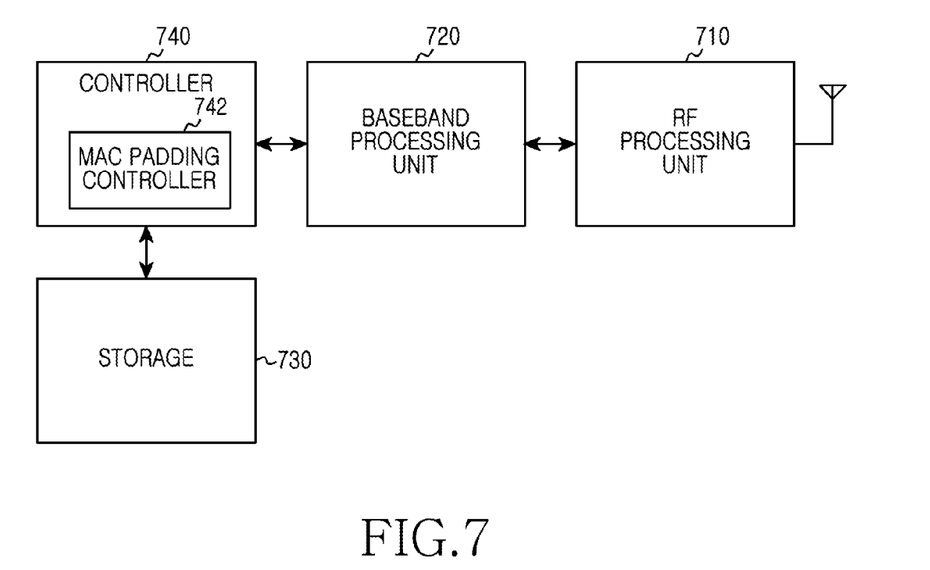
FIG. 7 illustrates a block construction of a terminal apparatus in a wireless communication system according to an embodiment of the present disclosure.

FIG. 7 illustrates a block construction of a terminal apparatus in a wireless communication system according to an embodiment of the present disclosure.

Referring to FIG. 7, a terminal is illustrated to include an RF processing unit 710, a baseband processing unit 720, a storage 730, a controller 740, and a MAC padding controller 742.

The RF processing unit 710 performs a function for transmitting/receiving a signal through a wireless channel such as signal band conversion, amplification and the like. That is, the RF processing unit 710 up converts a baseband signal provided from the baseband processing unit 720 into an RF band signal and then transmits the RF band signal through an antenna, and down converts an RF band signal received through the antenna into a baseband signal. For example, the RF processing unit 710 can include a transmission filter, a reception filter, an amplifier, a mixer, an oscillator, a Digital to Analog Converter (DAC), an Analog to Digital Converter (ADC) and the like. FIG. 7 above illustrates only one antenna, but the terminal can have a plurality of antennas. Also, the RF processing unit 710 can include a plurality of RF chains. For beamforming, the RF processing unit 710 can adjust a phase and magnitude of each signal transmitted/received through a plurality of antennas or antenna elements.

The baseband processing unit 720 performs a function of conversion between a baseband signal and a bit stream according to the physical layer standard of the system. For example, at data transmission, the baseband processing unit 720 generates complex symbols by encoding and modulating a transmission bit stream. Also, at data reception, the baseband processing unit 720 restores a reception bit stream by demodulating and decoding a baseband signal provided from the RF processing unit 710. For example, according to an Orthogonal Frequency-Division Multiplexing (OFDM) scheme, at data transmission, the baseband processing unit 720 generates complex symbols by encoding and modulating a transmission bit stream, maps the complex symbols to subcarriers, and then constructs OFDM symbols through Inverse Fast Fourier Transform (IFFT) operation and Cyclic Prefix (CP) insertion. Also, at data reception, the baseband processing unit 720 divides a baseband signal provided from the RF processing unit 710 in the unit of OFDM symbol, restores signals mapped to subcarriers through Fast Fourier Transform (FFT) operation, and restores a reception bit stream through demodulation and decoding. The baseband processing unit 720 and the RF processing unit 710 transmit and receive a signal as described above. In accordance to this, the baseband processing unit 720 and the RF processing unit 710 can be denoted as a transmitter, a reception part, a transmission/reception part, or a communication part.

The storage 730 stores data of a basic program for an operation of the terminal, an application program, setting information and the like. Particularly, the storage 730 can store information associated with MAC PDU transmission in the wireless communication system. And, the storage 730 provides stored data in response to a request of the controller 740.

The controller 740 controls the general operations of the terminal. For example, the controller 740 transmits/receives a signal through the baseband processing unit 720 and the RF processing unit 710. Also, the controller 740 records data in the storage 730, and reads the recorded data. In accordance to an embodiment of the present disclosure, the controller 740 includes the MAC padding controller 742. For example, the MAC padding controller 742 controls the terminal to perform the procedures illustrated in FIG. 3, FIG. 4, FIG. 5, and FIG. 6. An operation of the controller 740 according to an embodiment of the present disclosure is given as follows.

The controller 740 generates a data unit replacing padding with data. In detail, irrespective of the existence or absence of a retransmission request, the controller 740 replaces the padding with the data and generates a data unit. The terminal performs a process of, when it is a response mode, generating a data unit replacing the padding with one of a data unit failing to receive an acknowledgement response and a part of the data unit and, when it is a non-response mode, generating a data unit replacing the padding with one of the last transmitted data unit and data units transmitted within a re-response time from the last transmitted data unit.

In accordance to an embodiment of the present disclosure, the controller 740 generates a MAC PDU at a time when transmitting data using MAC padding. If the MAC padding is generated, the controller 740 replaces the MAC padding with RLC data through the MAC padding controller 742. The MAC padding controller 742 is allocated resources. When the MAC PDU is generated, if it is a UM, the MAC padding controller 742 records a generation time. If it is an AM, the MAC padding controller 742 selects a PDU failing to receive an ACK response or a part of the PDU in accordance to the size of the allocated resources and generates a PDU. If it is the UM, in accordance to the allocated resources, the MAC padding controller 742 selects one of a just-before last transmitted PDU and PDUs transmitted within a re-ordering time from the last transmitted PDU and generates a repeated transmission PDU, and arranges the sequence of a newly generated RLC PDU and newly constructs a MAC header.

Also, if two resources are allocated to the controller 740, when there is a retransmission request, the controller 740 compares a total size of PDUs related to RLC data among MAC PDUs of a firstly allocated resource and a size of a secondly allocated resource. If the size of the secondly allocated resource is greater than or is equal to the total size of the PDUs related to the RLC data, then the controller 740 repeatedly transmits the PDU related to the RLC data among the MAC PDUs of the firstly allocated resource, to the secondly allocated resource.

Also, if three or more resources are allocated to the controller 740, when there is a retransmission request, the controller 740 compares a total size of PDUs related to RLC data among generated MAC PDUs and a size of respective resources in which only padding exists among the allocated resources. If the total size of the PDUs related to the RLC data among the generated MAC PDUs is less than or is equal to the size of the respective resources in which only the padding exists, then the controller 740 repeatedly transmits the PDU related to the RLC data among the generated MAC PDUs, to the resources in which only the padding exists among the allocated resources. The present disclosure has an effect of increasing transmission efficiency by replacing meaningless padding with data in a wireless communication system.

In the aforementioned various embodiments of the present disclosure, constituent elements included in the disclosure have been expressed in the singular or plural form in accordance to the proposed various embodiments. But, the expression in the singular or plural form is merely selected suitable to a proposed situation for description convenience. It is not that the present disclosure is limited to the singular or plural constituent elements. Even the constituent element expressed in the plural form can be constructed in the singular form, or even the constituent element expressed in the singular form can be constructed in the plural form.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for a terminal in a wireless communication system, the apparatus comprising:
  at least one processor configured to:
    identify at least one resource allocated to the terminal;
    generate a first media access control (MAC) protocol data unit (PDU) comprising a first header, first data comprising at least one radio link control (RLC) PDU and at least one padding bit, if an amount of the at least one resource allocated to the terminal is greater than an amount of another resource to which the first data is mapped,
    select second data comprising at least one RLC PDU among a plurality of user data in data units that are unrequested to be retransmitted, and
    generate a second MAC PDU by replacing the at least one padding bit with the selected second data and replacing the first header to a second header in accordance with a rearranged sequence of RLC PDUs in the first data and the second data; and
  a transceiver configured to transmit, to a base station, the second MAC PDU comprising the second header, the first data and the second data,
  wherein the data units include a last transmitted RLC PDU and at least one RLC PDU transmitted within a predetermined period of time from a transmission of the last transmitted RLC PDU, and
  wherein the predetermined period of time is a reordering time for which the base station waits for a hybrid automatic request (HARQ) retransmission of a data unit from the terminal.

2. The apparatus of claim 1, wherein, the second MAC PDU is generated without a retransmission request for the second data.

3. The apparatus of claim 1,
  wherein the second data is selected based on a channel environment of an initial transmission of the second data.

4. The apparatus of claim 1,
  wherein, if the at least one resource allocated to the terminal comprises a plurality of resources, the at least one processor is further configured to compare a total size of data of a firstly allocated resource among the plurality of resources with a size of a secondly allocated resource among the plurality of resources, the second allocated resource comprised of only padding of the at least one padding bit of the first MAC PDU, and
  wherein, if the size of the secondly allocated resource is greater than or equal to the total size of the data of the firstly allocated resource, the at least one processor is further configured to generate the second MAC PDU by inserting the data of the firstly allocated resource into a location of the padding of the at least one padding bit in the secondly allocated resource.

5. The apparatus of claim 1, wherein, if the at least one resource allocated to the terminal comprises a plurality of resources, the at least one processor is further configured to repeatedly transmit at least one data unit using two or more resources among the plurality of resources.

6. The apparatus of claim 5, wherein the at least one processor is further configured to transmit the at least one data unit by inserting data of a firstly allocated resource into at least one resource among the plurality of resources comprised of only padding of the at least one padding bit.

7. The apparatus of claim 1, wherein the second data is selected based on a number of retransmission repetition.

8. The apparatus of claim 1, wherein the second data is selected to maximize a number of user data to be included to the second MAC PDU.

9. The apparatus of claim 1,
  wherein the predetermined period of time is related to the HARQ retransmission used in a physical layer.

10. A method for operating a terminal in a wireless communication system, the method comprising:
  identifying at least one resource allocated to the terminal;
  generating a first media access control (MAC) protocol data unit (PDU) comprising a first header, first data comprising at least one radio link control (RLC) PDU and at least one padding bit, if an amount of the at least one resource allocated to the terminal is greater than an amount of another resource to which the first data is mapped;
  selecting second data comprising at least one RLC PDU among a plurality of user data in data units that are unrequested to be retransmitted;
  generating a second MAC PDU by replacing the at least one padding bit with the selected second data and replacing the first header to a second header in accordance with a rearranged sequence of RLC PDUs in the first data and the second data; and
  transmitting, to a base station, the second MAC PDU comprising the second header, the first data and the second data,
  wherein the data units include a last transmitted RLC PDU and at least one RLC PDU transmitted within a predetermined period of time from a transmission of the last transmitted RLC PDU, and
  wherein the predetermined period of time is a reordering time for which the base station waits for a hybrid automatic request (HARQ) retransmission of a data unit from the terminal.

11. The method of claim 10, wherein the second MAC PDU is generated without a retransmission request for the second data.

12. The method of claim 10,
  wherein the second data is selected based on a channel environment of an initial transmission of the second data.

13. The method of claim 10, wherein the generating of the second MAC PDU comprises:
  comparing, if the at least one resource allocated to the terminal comprises a plurality of resources, a total size of data of a firstly allocated resource among the plurality of resources with a size of a secondly allocated resource among the plurality of resources, the second allocated resource comprised of only padding of the at least one padding bit of the first MAC PDU; and generating, if the size of the secondly allocated resource is greater than or equal to the total size of the data of the firstly allocated resource, the second MAC PDU by inserting the data of the firstly allocated resource into a location of the padding of the at least one padding bit in the secondly allocated resource.

14. The method of claim 10, further comprising:
if the at least one resource allocated to the terminal comprises a plurality of resources, repeatedly transmitting at least one data unit using two or more resources among the plurality of resources.

15. The method of claim 14, wherein the transmitting of the at least one data unit comprises transmitting the at least one data unit by inserting data of a firstly allocated resource into at least one resource among the plurality of resources comprised of only padding of the at least one padding bit.

16. The method of claim 10, wherein the second data is selected based on a number of retransmission repetition.

17. The method of claim 10, wherein the second data is selected to maximize a number of user data to be included to the second MAC PDU.

18. The method of claim 10,
wherein the predetermined period of time is related to the HARQ retransmission used in a physical layer.

* * * * *